United States Patent
Yasuda et al.

(10) Patent No.: US 11,600,262 B2
(45) Date of Patent: Mar. 7, 2023

(54) RECOGNITION DEVICE, METHOD AND STORAGE MEDIUM

(71) Applicants: KABUSHIKI KAISHA TOSHIBA, Minato-ku (JP); TOSHIBA DIGITAL SOLUTIONS CORPORATION, Kawasaki (JP)

(72) Inventors: Koji Yasuda, Yokohama (JP); Kenta Cho, Kawasaki (JP)

(73) Assignees: KABUSHIKI KAISHA TOSHIBA, Minato-ku (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 71 days.

(21) Appl. No.: 16/429,911

(22) Filed: Jun. 3, 2019

(65) Prior Publication Data
US 2019/0378496 A1 Dec. 12, 2019

(30) Foreign Application Priority Data
Jun. 7, 2018 (JP) ............................. JP2018-109442

(51) Int. Cl.
*G10L 15/26* (2006.01)
*G06F 40/205* (2020.01)
(Continued)

(52) U.S. Cl.
CPC .......... *G10L 15/083* (2013.01); *G06F 40/205* (2020.01); *G06F 40/284* (2020.01); *G10L 15/26* (2013.01); *G10L 2015/088* (2013.01)

(58) Field of Classification Search
CPC . G10L 15/083; G10L 15/26; G10L 2015/088; G10L 15/22; G10L 15/063;
(Continued)

(56) References Cited

U.S. PATENT DOCUMENTS 7,603,276 B2 * 10/2009 Yoshizawa .............. G10L 15/06 704/243
8,055,503 B2 * 11/2011 Scarano .............. H04M 3/5183 704/270

(Continued)

FOREIGN PATENT DOCUMENTS

JP 2016-180915 10/2016
JP 6216560 B2 10/2017

OTHER PUBLICATIONS

Li Deng, et al., "Deep Learning: Methods and Applications", Foundations and Trends® in Signal Processing, vol. 7, Nos. 3-4, 2013, Downloaded from: https://www.microsoft.com/en-us/research/wp-content/uploads/2016/02/DeepLearning-NowPublishing-Vol7-SIG-039.pdf, 197 pages.

(Continued)

*Primary Examiner* — Richemond Dorvil
*Assistant Examiner* — Rodrigo A Chavez
(74) *Attorney, Agent, or Firm* — Oblon, McClelland, Maier & Neustadt, L.L.P.

(57) ABSTRACT

According to one embodiment, a recognition device includes storage and a processor. The storage is configured to store a first recognition model, a first data set, and tags, for each first recognition model. The processor is configured to acquire a second data set, execute recognition processing of the second recognition target data in the second data set by using the first recognition model, extract a significant tag of the tags stored in the storage in association with the first recognition model, based on the recognition processing result and the second correct data in the second data set, and create a second recognition model based on the acquired second data set and the first data set stored in the storage in association with the extracted tag.

11 Claims, 11 Drawing Sheets

(51) Int. Cl.
*G06F 40/284* (2020.01)
*G10L 15/08* (2006.01)

(58) Field of Classification Search
CPC ....... G10L 15/02; G10L 15/08; G10L 15/183; G10L 15/32; G10L 15/18; G10L 15/28; G06F 40/284; G06F 40/205
USPC ........................................................ 704/231
See application file for complete search history.

(56) References Cited

U.S. PATENT DOCUMENTS

| | | | | |
|---|---|---|---|---|
| RE44,248 E | * | 5/2013 | Poirier | G10L 15/07 704/235 |
| 8,548,808 B2 | * | 10/2013 | Nakano | G10L 15/005 704/257 |
| 8,831,939 B2 | * | 9/2014 | Obuchi | G10L 15/30 704/226 |
| 9,229,681 B2 | * | 1/2016 | Cho | G10L 15/22 |
| 9,495,955 B1 | * | 11/2016 | Weber | G10L 15/063 |
| 9,697,827 B1 | * | 7/2017 | Lilly | G10L 15/19 |
| 9,786,270 B2 | * | 10/2017 | Senior | G10L 15/063 |
| 10,224,036 B2 | * | 3/2019 | Lindle | G01L 15/00 |
| 10,255,907 B2 | * | 4/2019 | Nallasamy | G10L 15/063 |
| 10,354,642 B2 | * | 7/2019 | Gurunath Kulkarni | G10L 25/51 |
| 10,403,268 B2 | * | 9/2019 | Trawick | G10L 15/08 |
| 10,497,370 B2 | * | 12/2019 | Fry | G10L 15/1815 |
| 10,573,312 B1 | * | 2/2020 | Thomson | G10L 15/187 |
| 10,580,400 B2 | * | 3/2020 | Jeong | G10L 15/005 |
| 10,672,388 B2 | * | 6/2020 | Hori | G10L 15/22 |
| 10,706,843 B1 | * | 7/2020 | Elangovan | G06F 16/156 |
| 2003/0036903 A1 | * | 2/2003 | Konopka | G10L 15/065 704/E15.009 |
| 2008/0069437 A1 | * | 3/2008 | Baker | G06K 9/6256 382/159 |
| 2013/0346066 A1 | * | 12/2013 | Deoras | G06F 40/20 704/E15.001 |
| 2014/0278425 A1 | * | 9/2014 | Jost | G10L 15/063 704/257 |
| 2014/0278426 A1 | * | 9/2014 | Jost | G10L 15/06 704/257 |
| 2019/0304437 A1 | * | 10/2019 | Qian | G10L 15/063 |
| 2021/0005191 A1 | * | 1/2021 | Chun | G10L 15/1815 |

OTHER PUBLICATIONS

Shinji Takaki, et al., "Development of Statistical Speech Synthesis System Using Acoustic Feature Extraction and Acoustic Model Based on Deep Neural Network", The Special Interest Group Technical Reports of IPSJ (IPSJ SIG Technical Report, vol. 2015-SLP-105, No. 2, Feb. 27, 2015 (with English Translation) 15 pages.
"Recaius Contact Center Plus" Downloaded on May 15, 2018 from: https://www.toshiba-sol.co.jp/pro/recaius/lineup/contactcenter02.html (with English Translation) 4 pages.
"Recaius—Voice Transcription Editor", Jul. 1, 2017, (with English Translation) 4 pages.

* cited by examiner

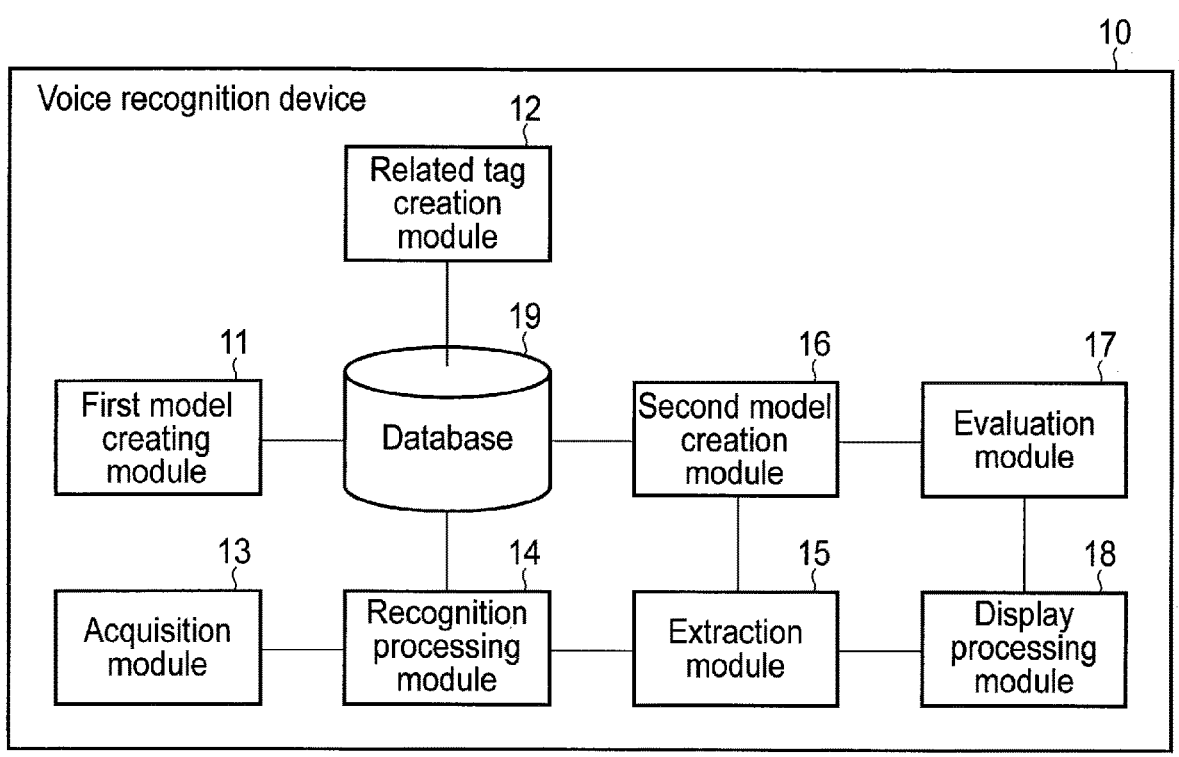
F I G. 1

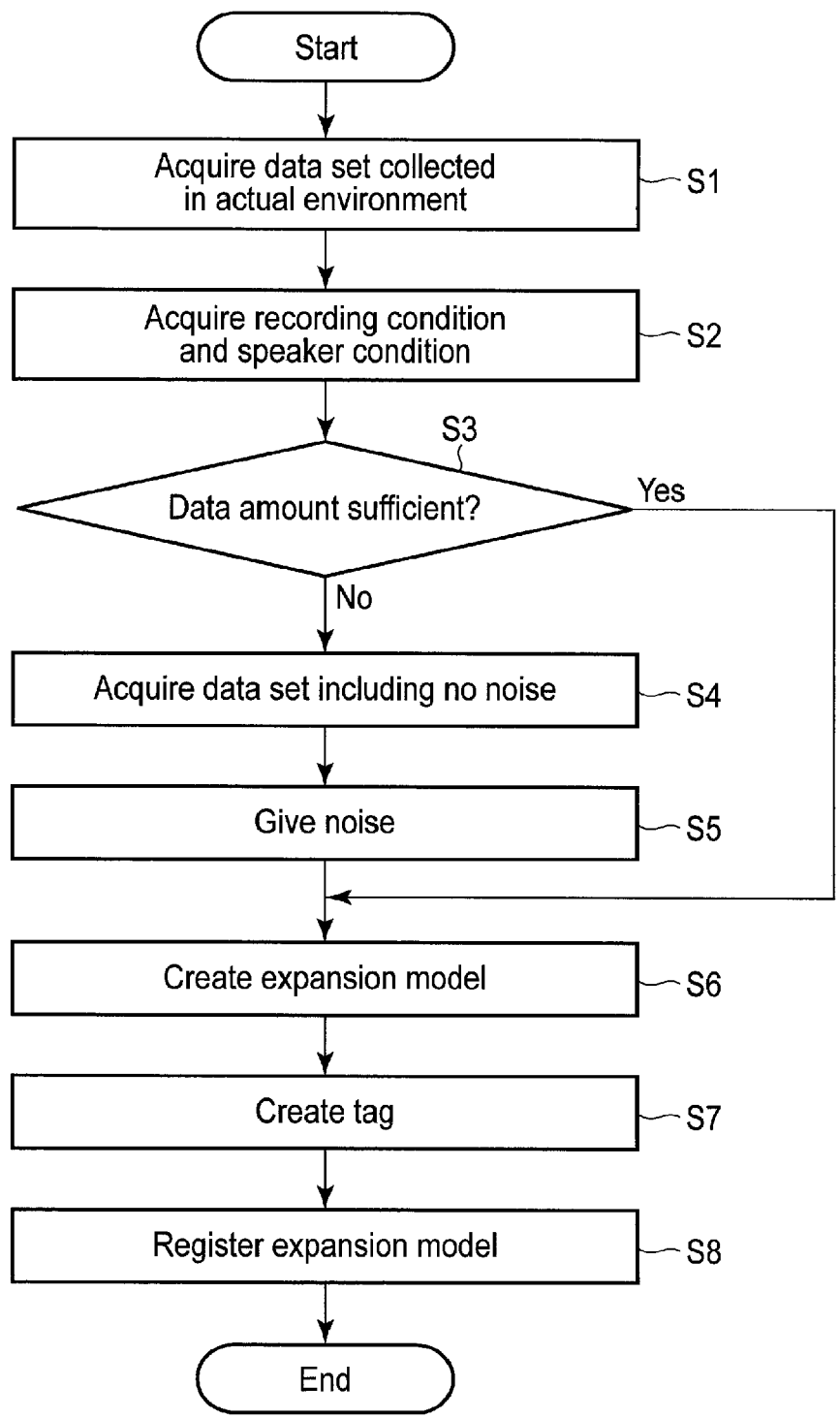
F I G. 3

EXPANSION MODEL A

- Outdoors
- Factory
- Noise present
- Microphone A
- Male (speaker's sex)
- Twenties (speaker's age)
- 1 m (recording distance)
- ...

F I G. 4

EXPANSION MODEL B

- Indoors
- Call center
- Noise absent
- Microphone B
- Female (speaker's sex)
- Twenties (speaker's age)
- 5 cm (recording distance)
- ...

F I G. 5

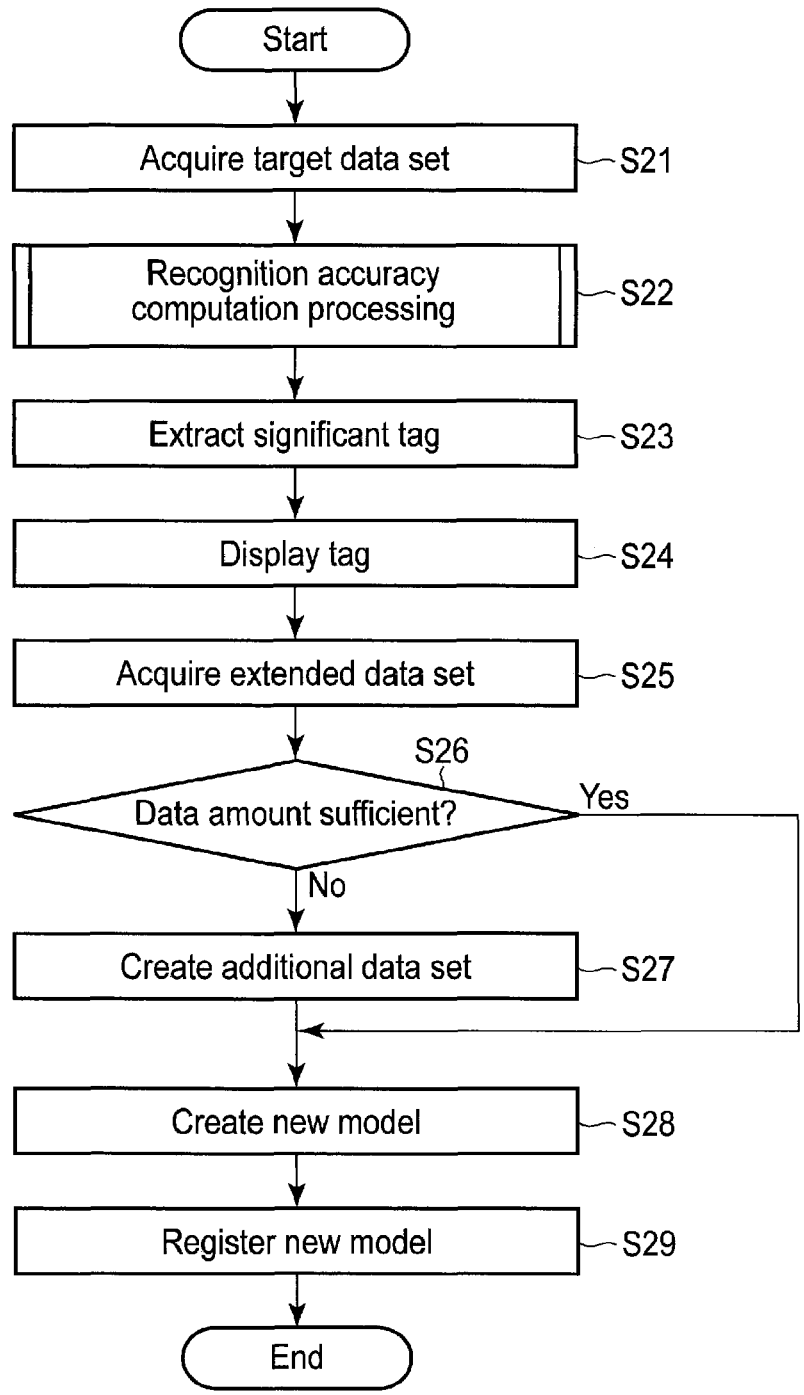
F I G. 7

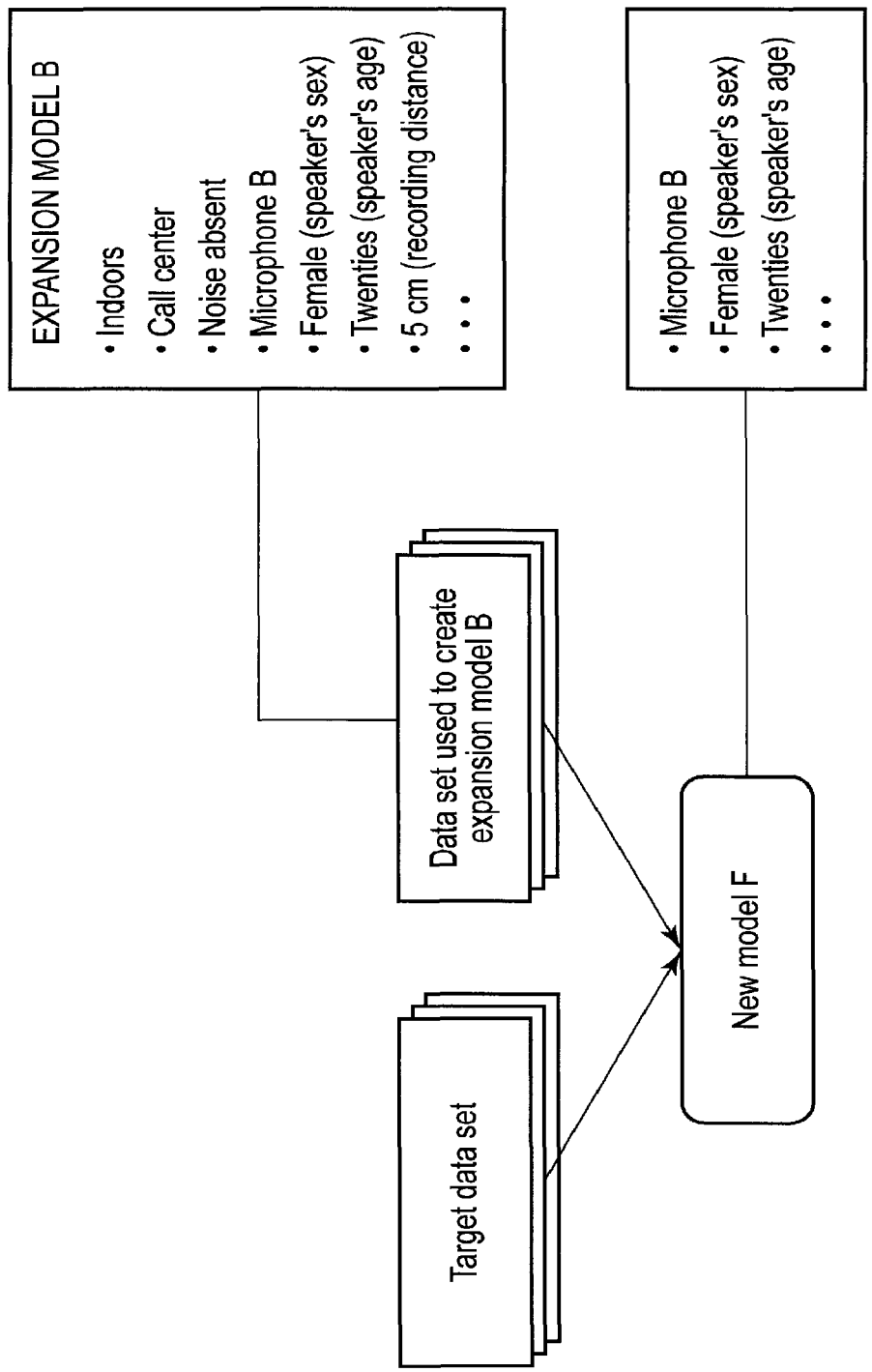
F I G. 10

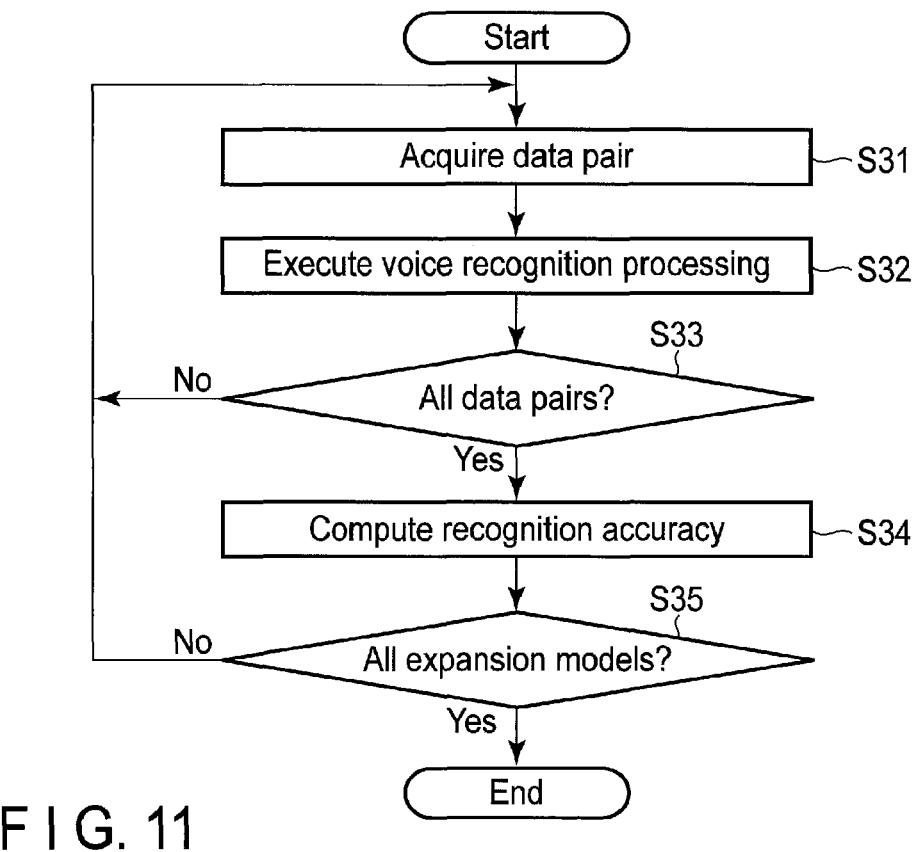
F I G. 11
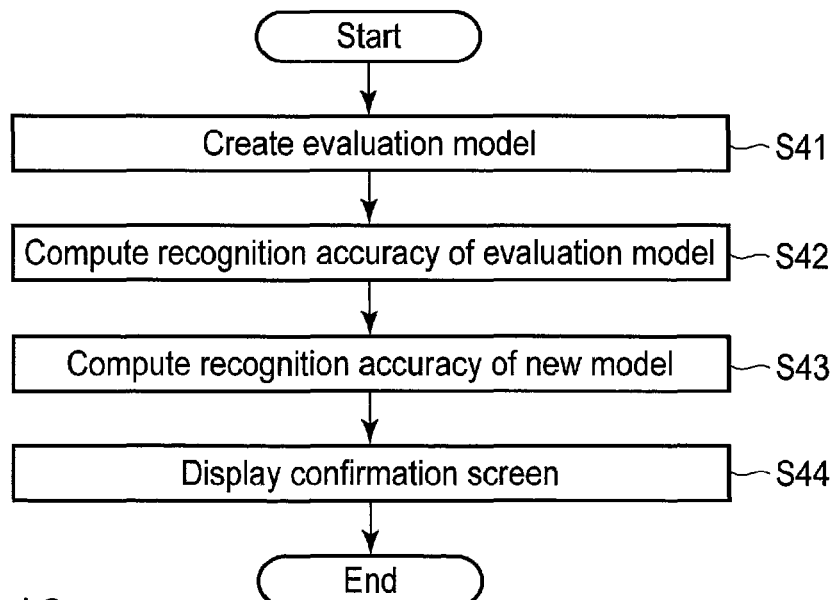
F I G. 12

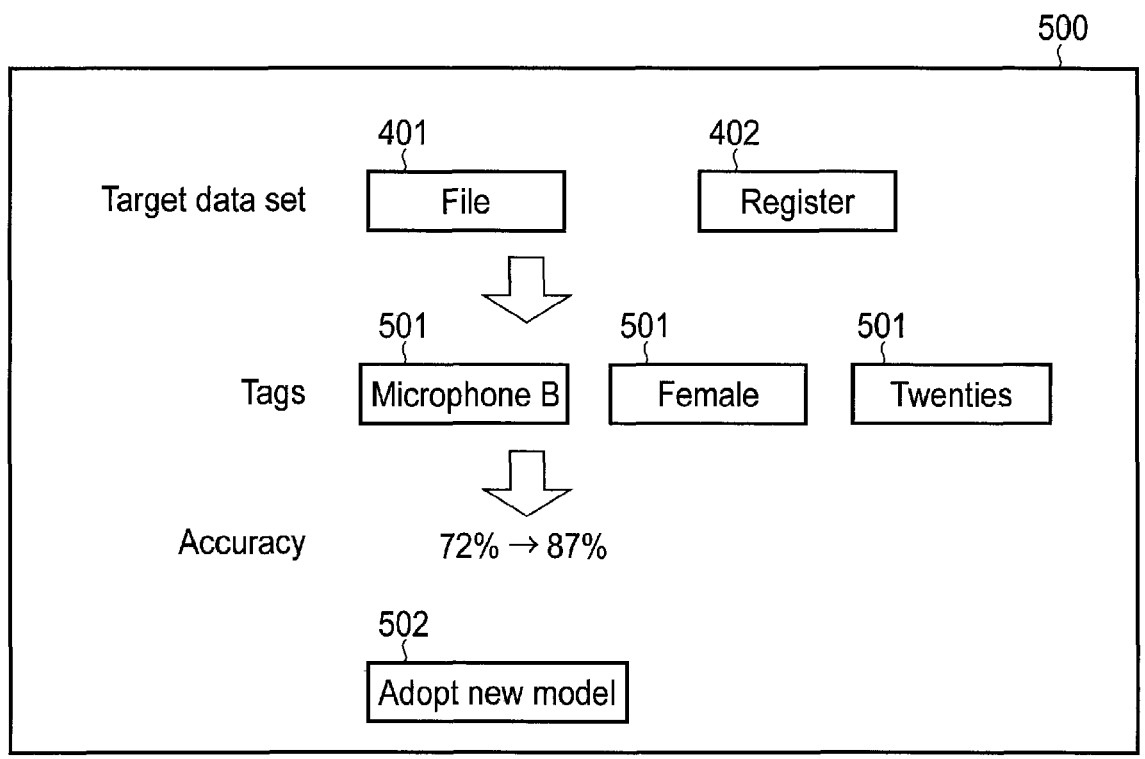
F I G. 15
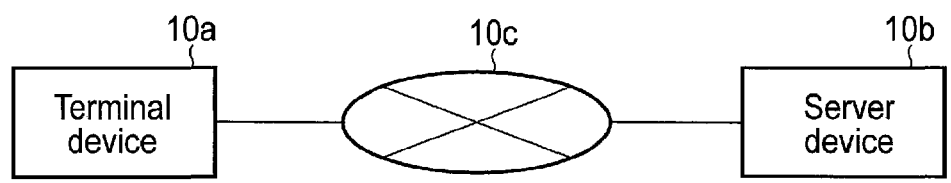
F I G. 16

RECOGNITION DEVICE, METHOD AND STORAGE MEDIUM

CROSS-REFERENCE TO RELATED APPLICATIONS

This application is based upon and claims the benefit of priority from Japanese Patent Application No. 2018-109442, filed Jun. 7, 2018, the entire contents of which are incorporated herein by reference.

FIELD

Embodiments described herein relate generally to a recognition device, a method and a storage medium.

BACKGROUND

In general, for example, a recognition model including an acoustic model, a language model, etc., is used in voice recognition which recognizes voice data and converts the voice data into a text.

Such a recognition model is created based on a data set (learning data), but preparing a data set including a sufficient data amount to create a recognition model of high recognition accuracy is difficult.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing an example of a functional configuration of a voice recognition device according to the embodiments.

FIG. 3 is a flowchart showing an example of processing of expansion model registration processing.

FIG. 4 is an illustration for explanation of an example of a tag stored in a database.

FIG. 5 is an illustration for explanation of an example of a tag stored in a database.

FIG. 7 is a flowchart showing an example of processing of new model creation processing.

FIG. 10 is a block diagram showing a concept of new model creation processing.

FIG. 11 is a flowchart showing an example of processing of recognition accuracy computation processing.

FIG. 12 is a flowchart showing an example of processing of confirmation screen displaying processing.

FIG. 15 is a block diagram showing an example of a confirmation screen.

FIG. 16 is a block diagram showing an example of a configuration of the voice recognition system.

DETAILED DESCRIPTION

Figure 2:
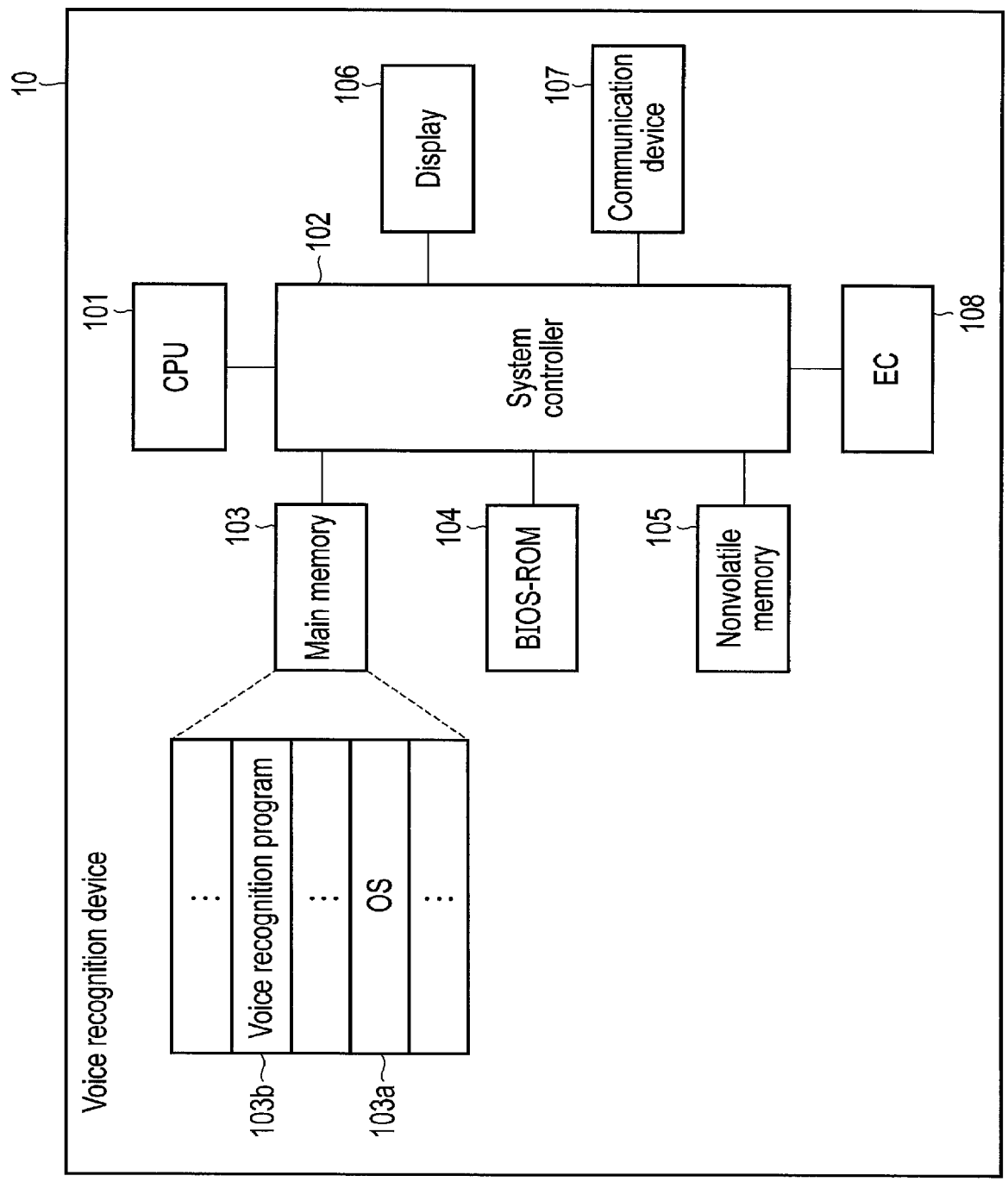
FIG. 2 is a block diagram showing an example of a hardware configuration of the voice recognition device.

In general, according to one embodiment, a recognition device includes storage and a processor. The storage is configured to store a first recognition model created based on a first data set including first recognition target data collected under a predetermined condition and first correct data to be recognized from the first recognition target data, the first data set, and tags indicative of the condition, for each first recognition model. The processor is configured to acquire a second data set including second recognition target data and second correct data to be recognized from the second recognition target data, execute recognition processing of the second recognition target data in the second data set by using the first recognition model stored in the storage, extract a significant tag of the tags stored in the storage in association with the first recognition model used for the recognition processing, based on the recognition processing result and the second correct data in the second data set, and create a second recognition model based on the acquired second data set and the first data set stored in the storage in association with the extracted tag.

Various embodiments will be described hereinafter with reference to the accompanying drawings.

A recognition device of the embodiments includes a voice recognition device used to recognize voice data with a voice recognition model and perform processing of converting the voice data into a text (voice recognition processing). The recognition device of the embodiments is assumed to be a voice recognition device in the following descriptions.

The voice recognition model used in the voice recognition processing includes an acoustic model for inputting a characteristic amount converted from a voice data waveform and outputting (extracting) phonemes expressing in the voice data and a language model for inputting the phonemes and converting the phonemes into a text (character string) and is implemented by, for example, a deep neural network or the like.

FIG. 1 is a block diagram showing an example of a functional configuration of a voice recognition device according to the embodiments. The voice recognition device of the embodiments includes a function of creating a voice recognition model used in the voice recognition processing, and the like, in addition to the function of performing the voice recognition processing.

As shown in FIG. 1, a voice recognition device 10 includes a first model creation module 11, a related tag creation module 12, an acquisition module 13, a recognition processing module 14, an extraction module 15, a second model creation module 16, an evaluation module 17, a display processing module 18, and a database (storage) 19.

The first model creation module 11 creates a voice recognition model based on a data set including voice data (recognition target data) collected under predetermined conditions and a text (correct data) which should be recognized from the voice data. The recognition model created by the first model creation module 11 is registered into the database 19.

In the database 19, the data set created by the first model creation module 11, a tag indicative of the conditions for collecting the voice data included in the data set, and the like are stored in association with each other, for each voice recognition model created by the first model creation module 11.

The related tag creation module 12 creates the tag (hereinafter referred to as a related tag) related to the tag stored in the database 19. The related tag is created by using, for example, the data set and the like stored in the database 19. The related tag created by the related tag creation module 12 is stored in the database 19.

In the embodiments, for example, the voice recognition model having high recognition accuracy to the voice data collected in predetermined conditions is assumed to be created. In this case, the user specifies the data set including the voice data collected in predetermined conditions and the text written from the voice, for example, by hand. The predetermined conditions in the embodiments are assumed to include the environment and situation where the voice data is recorded, and the concept of a speaker who utters the voice, etc.

When the data set is specified by the user as described above, the acquisition module 13 acquires the data set.

The recognition processing module 14 performs voice recognition processing for the voice data included in the data set acquired by the acquisition module 13 using each of the voice recognition models stored in the database 19. According to the voice recognition processing, a sound is recognized from the voice data, and the sound is converted into text.

The extraction module 15 extracts a significant tag out of the tags stored in the database 19 in association with the voice recognition model used for the voice recognition processing, based on the voice recognition processing result of the recognition processing module 14 and the text included in the data set acquired by the acquisition module 13.

The second model creation module 16 acquires the data set stored in the database 19 in association with the tag extracted by the extraction module 15. The second model creation module 16 creates the voice recognition model, based on the data set acquired by the acquisition module 13 and the data set acquired by the second model creation module 16. The voice recognition model created by the second model creation module 16 is registered into the database 19.

The evaluation module 17 computes the recognition accuracy (evaluation value) of the voice recognition model created by the second model creation module 16.

The display processing module 18 displays the recognition accuracy computed by the evaluation module 17 to the user. In addition, the display processing module 18 may display the tag extracted by the above-described extraction module 15 to the user before the voice recognition model is created by the above-described second model creation module 16.

It has been explained with reference to FIG. 1 that the voice recognition device 10 includes the database 19, but the database 19 may be provided outside the voice recognition device 10.

FIG. 2 shows an example of hardware configuration of the voice recognition device 10 shown in FIG. 1. In the embodiments, the voice recognition device 10 can be implemented as, for example, an electronic device such as a personal computer.

As shown in FIG. 2, the voice recognition device 10 includes CPU 101, a system controller 102, a main memory 103, BIOS-ROM 104, a nonvolatile memory 105, a display 106, a communication device 107, and embedded controller (EC) 108, and the like.

CPU 101 is a hardware processor which controls operations of various components in the voice recognition device 10. CPU 101 executes various programs loaded to the main memory 103 from the nonvolatile memory 105 which is a storage device. An operating system (OS) 103a and various application programs are included in these programs. In the embodiments, a voice recognition program 103b for implementing, for example, a function of creating the above-described voice recognition model, a function of executing the voice recognition processing using the voice recognition model, and the like are included in the application program executed by CPU 101.

Some or all of the modules 11 to 18 shown in FIG. 1 described above are assumed to be implemented by causing CPU 101 (i.e., the computer of the voice recognition device 10) to execute the voice recognition program 103b, i.e., by software. The voice recognition program may be stored in a computer-readable storage medium and distributed or may be downloaded to the voice recognition device 10 through a network. Some or all of the modules 11 to 18 may be implemented by hardware such as an integrated circuit (IC) or may be implemented as a combined configuration of software and hardware. In addition, the database 19 shown in FIG. 1 can be implemented with, for example, the nonvolatile memory 105 or other storage devices.

CPU 101 also executes the basic input/output system (BIOS) stored in BIOS-ROM 104. BIOS is a program for hardware control.

The system controller 102 is a device which makes connection between a local bus of CPU 101 and various components.

The display 106 is, for example, a display device such as a liquid crystal display (LCD). The communication device 107 is a device configured to execute communications by a cable or wireless means. EC 108 is a one-chip microcomputer including an embedded controller for electric power control.

Only CPU 101, the system controller 102, the main memory 103, BIOS-ROM 104, the nonvolatile memory 105, the display 106, the communication device 107, and EC 108 are shown in FIG. 2, but the voice recognition device 10 may include, for example, other storage devices such as a hard disk drive (HDD) and a solid state drive (SSD) and may include other input devices, output devices, and the like.

Next, operations of the voice recognition device 10 of the embodiments will be explained. In the embodiments, for example, processing (hereinafter referred to as new model creation processing) of newly creating a voice recognition model with high recognition accuracy to the voice data recorded in the predetermined conditions is performed but, in the new model creation processing, a plurality of voice recognition models preliminarily registered in the database 19 as described later is used.

For this reason, the voice recognition device 10 performs processing (hereinafter referred to as expansion model registration processing) of registering a voice recognition model used in the new model creation processing in the database 19 before the above-described new model creation processing.

First, an example of the procedure of expansion model registration processing will be described with reference to a flowchart of FIG. 3. The expansion model registration processing is performed by the first model creation module 11. In the following descriptions, the voice recognition model registered in the database 19 in the expansion model registration processing is called an expansion model (extension model) for convenience.

The first model creation module 11 acquires a prepared data set (step S1). The data set acquired in step S1 includes a pair (hereinafter referred to as a data pair) of voice data, for example, collected under predetermined conditions (in an actual environment) and a text formed by writing voice based on the voice data by hand. A plurality of data pairs are included in the data set.

The conditions of collecting the voice data include, for example, a recording condition, a speaker condition, and the like. The recording condition is a condition on an environment of recording (collecting) the voice data and includes, for example, a recording location, indoor/outdoors, the presence of noise, the type of microphone recording the voice data, a distance (hereinafter referred to as a recording distance) between a person who utters the voice and the microphone recording the voice data upon recording the voice data, and the like. In addition, the speaker condition is a condition on the person (speaker) who utters the voice upon recording the voice data and includes, for example, sex, age, and the like.

The voice data in each of the plurality of data pairs included in the data set acquired in step S1 is determined to be collected under the same or partially common recording condition and the speaker condition, and the recording condition and the speaker condition are considered to be obvious.

The first model creation module 11 acquires the recording condition and the speaker information designated by the user (step S2). The user in the embodiments may be, for example, a manager of the voice recognition device 10 or a person using the voice recognition model newly created by new model creation processing described later. The above elements are the same in the following descriptions.

A number of data pairs are required to create the voice recognition model of high recognition accuracy, but the voice data needs to be collected under predetermined conditions and preparation of a data set with a sufficient data amount is often difficult.

For this reason, the first model creation module 11 determines whether the data amount of the data set acquired in step S1 is sufficient to create a voice recognition model of a high recognition accuracy or not (step S3).

In step S3, for example, if the total time (total length) of the voice data included in the data set acquired in step S1 is more than or equal to a predetermined value (for example, ten hours or the like), it is determined that the data amount of the data set is sufficient. In contrast, if the total time of the voice data included in the data set acquired in step S1 is not more than or equal to a predetermined value, it is determined that the data amount of the data set is not sufficient.

It is determined whether the data amount is sufficient or not based on the total time of the voice data included in the data set but, for example, it may be determined whether the data amount of the data set is sufficient or not based on whether the total number of characters (or total number of words) constituting the text included in the data set is more than or equal to a predetermined value or not.

Even if preparation of the data set with a sufficient data amount that satisfies the predetermined conditions (recording condition and speaker condition) is difficult as described above, the speaker data satisfying the speaker condition may be able to be prepared comparatively easily although the data does not satisfy the recording condition.

For this reason, if it is determined that the data amount of the data set is not sufficient, in step S3 (NO in step S3), the first model creation module 11 acquires, for example, a data set including the voice data which satisfies the prepared speaker condition acquired in step S2 described above and a text written from the voice based on the voice data by hand (step S4). It is assumed that the voice data included in the data set acquired in step S3 is voice data which is not affected by an influence from the recording condition and which is clear without reverberation or noise.

The first model creation module 11 gives the noise based on the recording conditions (noise generation conditions) acquired in step S2 described above to the voice data included in the data set acquired in step S4 (step S5). The data set (voice data) for creating the voice recognition model can be thereby expanded (augmented).

The noise given to the voice data in step S5 includes a household sound, a mechanical operation sound or the like assumed to be generated under the recording conditions. In addition, in step S5, the reverberation noise and the like generated by using prepared simulation or the like may be given.

The data set including, for example, the voice data which satisfies the speaker condition is acquired in step S4 but, if the same voice data as the voice data collected under the recording condition and the speaker condition acquired in step S2 can be obtained, voice data collected under the other conditions may be acquired in step S4. In addition, in step S5, other processing except giving the noise in accordance with the data set (voice data) acquired in step S3 may be executed.

Next, the first model creation module 11 creates the expansion model (voice recognition model) based on the data set acquired in step S1 and the data set obtained by giving the noise to the voice data in step S5 (step S6). The expansion model is created by, for example, sequentially learning the data pair of the voice data and text included in the data set acquired in step S1 and the data set obtained by giving the noise to the voice data in step S5.

The first model creation module 11 creates the tag indicative of the conditions under which the voice data has been collected based on the recording condition and speaker condition acquired in step S2 (step S7). If the recording condition acquired in step S2 includes, for example, an element that a recording location is a call center, the first model creation module 11 creates a "call center" as a tag. In addition, if the speaker condition acquired in step S2 includes, for example, female in her twenties, the first model creation module 11 creates "twenties" and "female" as tags. Thus, plural tags may be created in step S6.

If the above-described recording condition includes presence or absence of noise, a tag "noise present" or "noise absent" can be created but, even if the recording condition includes presence or absence of noise, the presence or absence of noise may be determined by, for example, analyzing the voice data included in the data sets, and a tag "noise present" or "noise absent" may be created based on the determination result.

The expansion model created in step S6 is registered in the database 19 in association with the data sets used for creation of the expansion model (i.e., the data set acquired in step S1 and the data set obtained by giving the noise to the voice data in step S5) and the tag created in step S7 (step S8).

In contrast, if it is determined that the data amount of the data set is sufficient in step S3 (YES in step S3), the processing in steps S4 and S5 is not performed but the processing in step S6 and the following steps is performed. In this case, in step S6, the expansion model needs only to be created based on the data set acquired in step S1.

The expansion model is managed integrally in the database 19 together with the data sets and the tag, by the above-described expansion model registration processing.

The expansion model thus managed in the database 19 is used in the new model creation processing described later.

The expansion model registration processing is executed under each of conditions (i.e., situations) of collecting the voice data. That is, the voice recognition models specific to the voice recognition of the voice data collected in the situations specified by different recording conditions and speaker conditions (i.e., models having high recognition accuracy to the voice data) is registered in the database 19.

Examples of the tags stored in the database 19 in association with expansion models will be described with reference to FIG. 4 and FIG. 5.

FIG. 4 shows examples of the tags indicative of the conditions (recording condition and speaker condition) under which the voice data included in the data set used for creation of expansion model A has been collected. FIG. 5 shows examples of the tags indicative of the conditions (recording condition and speaker condition) under which the voice data included in the data set used for creation of expansion model B has been collected.

In the example shown in FIG. 4, it is indicated that tags "outdoors", "factory", "noise present", "microphone A", "male", "twenties", and "1 m" are stored in the database 19 in association with the expansion model A.

According to this, it is indicated that the voice data included in the data set used for creation of the expansion model A has been recorded outside a noisy factory. In addition, it is also indicated that the voice data included in the data set used for creation of the expansion model A is the data obtained by recording the voice uttered by a male in his twenties with the microphone A in the distance of 1 m from the male.

The tags "outdoors", "factory", "noise present", "microphone A", and "1 m" of the tags shown in FIG. 4 are created under the above-described recording condition. In addition, the tags "male" and "his twenties" of the tags shown in FIG. 4 are created under the above-described speaker condition.

In contrast, in the example shown in FIG. 5, it is indicated that tags "indoors", "call center", "noise absent", "microphone B", "female", "twenties", and "5 cm" are stored in the database 19 in association with the expansion model B.

According to this, it is indicated that the voice data included in the data set used for creation of the expansion model B has been recorded inside a call center. In addition, it is also indicated that the voice data included in the data set used for creation of the expansion model B is the data obtained by recording the voice uttered by a female in his twenties with the microphone B in the distance of 5 cm from the female.

The tags "indoors", "call center", "noise absent", "microphone B", and "5 cm" of the tags shown in FIG. 5 are created under the above-described recording condition. In addition, the tags "female" and "her twenties" of the tags shown in FIG. 5 are created under the above-described speaker condition.

Tags stored in the database 19 in association with respective expansion model A and expansion model B have been described, and tags are also stored in the database 19 for other expansion models created with data sets including the voice data collected under the other conditions.

The tags described with reference to FIG. 4 and FIG. 5 are stored in the database 19 as, for example, texts (character information), but the tags may be elements other than texts. More specifically, for example, a feature amount of the voice data included in the data set used for creation of expansion model A is extracted with a Deep-auto-Encoder (DAE), and a key value (key-value) of the feature amount can be handled as a feature vector. In this case, this feature vector may be used as a tag. Thus, the tags in the embodiments are not only based on the recording condition, speaker condition, and the like specified by the user, but may be, for example, values (numerical values, vectors, or the like) extracted mechanically from the voice data, and the like.

In the database 19, the expansion model, the data set used for creation of the expansion model, and the tags indicative of the conditions of collecting the voice data included in the data set are stored for the respective expansion models as described above but, in the following descriptions, the data set and the tags stored in the database 19 in association with the expansion model are called a data set of expansion model and tags of expansion model for convenience.

Figure 6:
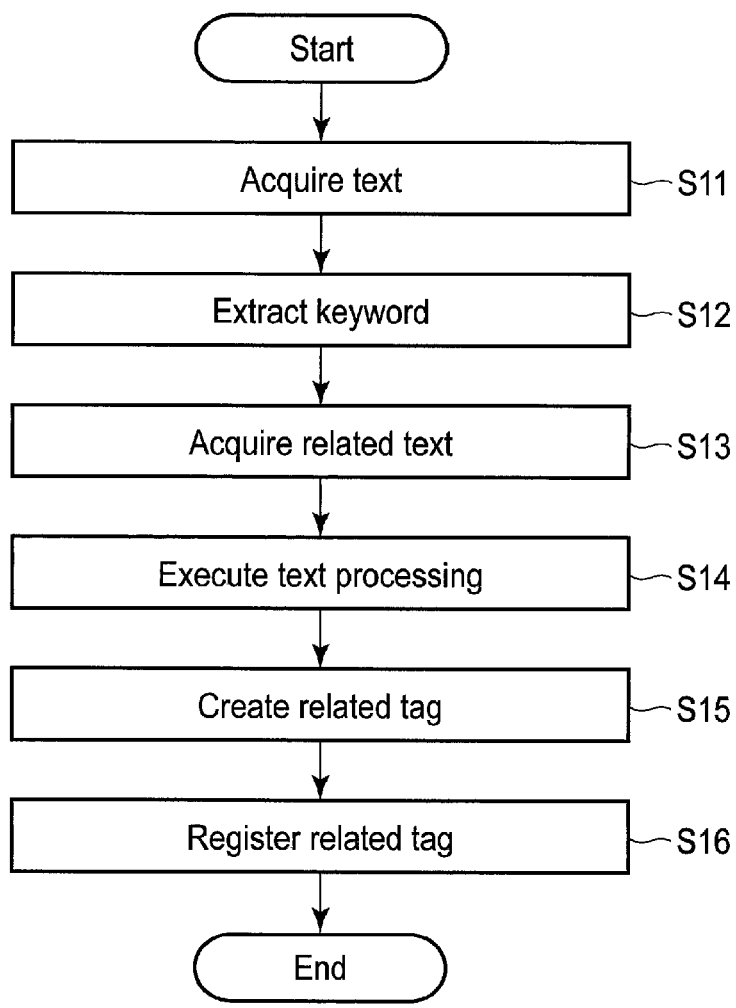
FIG. 6 is a flowchart showing an example of processing of related tag creation processing.

Next, an example of the procedure of related tag creation processing will be described with reference to the flowchart of FIG. 6. The related tag creation processing is processing executed prior to the new model creation processing, similarly to the expansion model registration processing, to create a related tag which is related to the tag registered in the database 19 in the expansion model registration processing. The related tag creation processing is executed by the related tag creation module 12.

The related tag creation processing is executed for each expansion model (data set for the expansion model) stored in the database 19. The expansion model which is the target of the related tag creation processing is called a target expansion model.

First, the related tag creation module 12 acquires a text (hereinafter referred to as a target text) included in the data set of the target expansion model from the database 19 (step S11).

Next, the related tag creation module 12 analyzes the target text acquired in step S11 and thereby extracts keywords from the target text (step S12). The keywords extracted in step S12 include words of high appearance frequency in the target text, and the like. In addition, the keywords may be, for example, tags for target expansion model.

The related tag creation module 12 acquires a related text with the keywords extracted in step S12 (step S13). The related text may be, for example, a text acquired from a Web site, etc., (i.e., acquired by clawing) or a text preliminarily stored in the voice recognition device 10. In step S13, plural related texts are acquired.

The related tag creation module 12 executes text processing for the plural related texts acquired in step S13 (step S14). The text processing includes, for example, clustering processing, topic classification (analysis) processing, or the like. The clustering processing is processing of classifying the plural related texts into plural clusters. The topic classification processing is processing of extracting a subject (topic) from the plural related texts.

The related tag creation module 12 creates related tags based on the result of the text processing in step S14 (step S15). If the clustering processing is executed as the above-described text processing, the related tag creation module 12 can creates words, etc., indicative of features of respective clusters (related texts classified in the clusters) as the related tags. In addition, if the topic classification processing is executed as the text processing, the related tag creation module 12 can create words, etc., indicative of the subject extracted by the topic classification processing as the related tags.

When the processing of step S15 is executed, the related tag creation module 12 registers the related tags created in step S15 in the database 19 (step S16). The related tags are stored in association with a target expansion model or the tags of the target expansion model.

The above-described related tag creation processing can automatically create and register the related tags related to a target expansion model or tags of the target expansion model. The related tags registered in the database 19 are used for new model creation processing to be described later.

Next, an example of the procedure of the above-described new model creation processing will be described with reference to the flowchart of FIG. 7.

The new model creation processing is, for example, processing of creating a new voice recognition model (hereinafter referred to as a new model) having high recognition accuracy to the voice data collected in the situations (conditions), based on the data set prepared by the user (i.e., a pair of the voice data collected in predetermined situations and the text written from the voice data by hand).

First, the acquisition module 13 acquires the data set prepared by the user (hereinafter referred to as a target data set) (step S21).

Next, recognition accuracy computation processing is executed (step S22). The recognition accuracy computation processing is processing of computing the recognition accuracy of each expansion model stored in the database 19 for the target data set.

The concept of the recognition accuracy computation processing executed in step S22 will be described with reference to FIG. 8.

Figure 8:
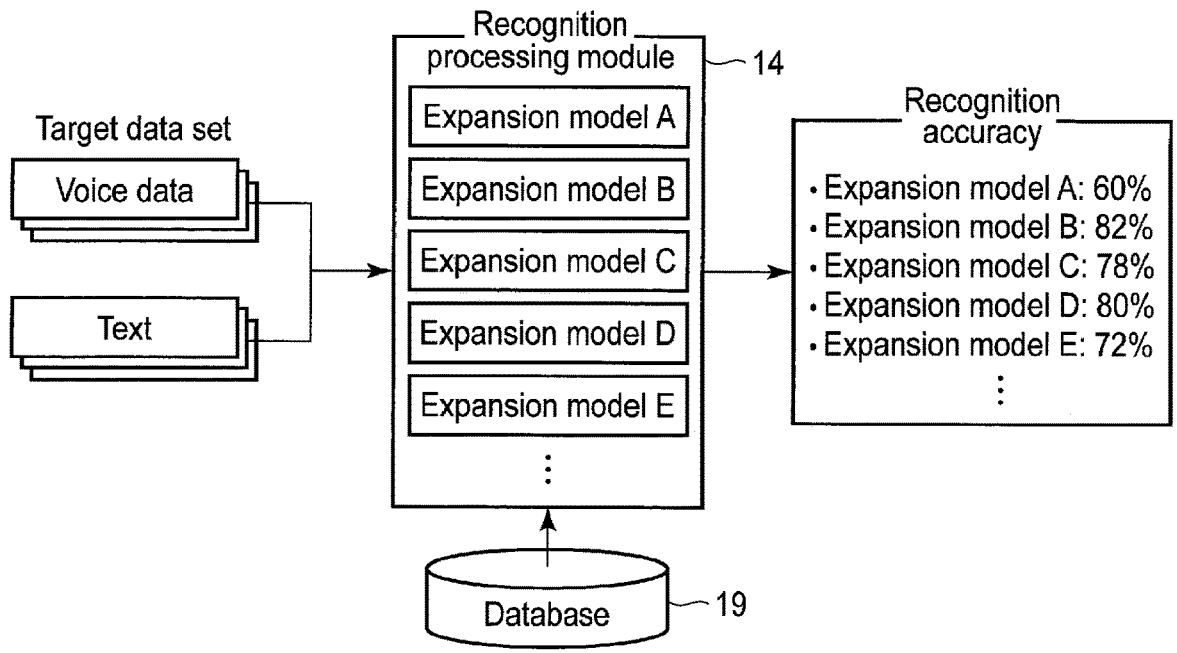
FIG. 8 is a block diagram for explanation of a concept of recognition accuracy computation processing.

As shown in FIG. 8, in the recognition accuracy computation processing, the voice recognition processing using the expansion model corresponding to each element of the voice data included in the target data set is executed for each of the expansion models stored in the database 19, by the recognition processing module 14.

In the recognition accuracy computation processing, the recognition accuracy of each of the expansion models is computed based on the voice recognition processing result of the recognition processing module 14.

In the example shown in FIG. 8, the recognition accuracy of expansion model A is computed at 60%, the recognition accuracy of expansion model B is computed at 82%, the recognition accuracy of expansion model C is computed at 78%, the recognition accuracy of expansion model D is computed at 80%, and the recognition accuracy of expansion model E is computed at 72%. The recognition accuracies of expansion models A to E are shown in FIG. 8 but recognition accuracies of the other expansion models are computed in the same manner.

The concept of the recognition accuracy computation processing has been described, and details of the recognition accuracy computation processing will be described later.

The descriptions return to FIG. 7, and the extraction module 15 computes a significant tag of the tags of expansion models stored in the database 19, based on the computed recognition accuracies of the respective expansion models in step S22 (step S23). Plural tags may be extracted in step S23.

The processing in step S23 will be described here. In step S23, it is assumed that the extraction module 15 uses the recognition accuracies of the respective expansion models computed in step S22 as accuracies of the tags of expansion models.

For example, if the tags of expansion model A are "outdoors", "factory", "noise present", "microphone A", "male", "twenties", and "1 m" as shown in FIG. 4 and the recognition accuracy of expansion model A is 60% as shown in FIG. 8, the accuracy of each of the tags of expansion model A is assumed to be 60%.

In addition, if the tags of expansion model B are "indoors", "call center", "noise absent", "microphone B", "female", "twenties", and "5 cm" as shown in FIG. 4 and the recognition accuracy of expansion model B is 82% as shown in FIG. 8, the accuracy of each of the tags of expansion model B is assumed to be 82%.

The tags of expansion model A and expansion model B have been described here but recognition accuracies of tags of the other expansion models are computed in the same manner.

For example, the same tag is often associated with different expansion models similarly to tag "twenties" of expansion model A and expansion B but, in this case, for example, a representative value such as a means value or a median determined by distribution of recognition accuracies of the respective expansion models is used as an accuracy of the tag. In addition, the higher one of recognition accuracies of expansion models associated with the same tag may be used as the accuracy of the tag.

Next, the extraction module 15 executes t-test using accuracies of all tags (recognition accuracies of expansion models) and thereby extracts a significant tag of the tags. According to the t-test, a test statistic called a t value is computed for each tag and the t value is converted into a p value. If the p value is, for example, 0.05 or less, it can be considered that the t value converted into the p value is a sufficiently large value, and the extraction module 15 can extract the tag for which the t value is computed as a significant tag. In the embodiments, the significant tag is indicative of a tag having a significantly high accuracy.

It is described that the threshold value to be compared with the p value to extract the significant tag is 0.05, but the threshold value may be, for example, 0.1 or the like.

In addition, it is described that the t-test is executed with accuracies of all the tags, but the t-test may be executed with, for example, accuracy of the tag higher than or equal to a predetermined value.

Furthermore, executing the t-test in the embodiments is described but, if a significant tag can be extracted, the other method of computing a statistic used to extract the significant tag may be employed. In addition, for example, a tag having an accuracy higher than or equal to a predetermined value may be extracted as a significant tag.

Next, the display processing module 18 displays the tag extracted in step S23 (step S24). The tag extracted in step S23 may be displayed on the display 106 provided at the voice recognition device 10 or on the other display device provided outside the voice recognition device 10.

Figure 9:
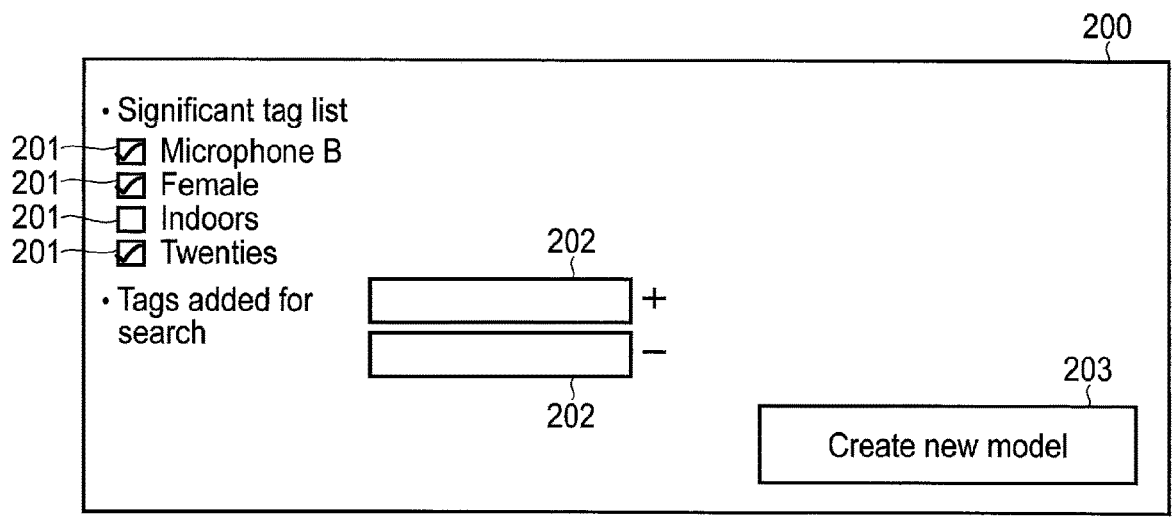
FIG. 9 is a block diagram showing an example of a tag display screen.

FIG. 9 shows an example of the display screen (hereinafter referred to as a tag display screen) on which the tag extracted in step S23 is displayed.

On a tag display screen 200 shown in FIG. 9, the tags extracted in step S24 are displayed as "significant tag list". In FIG. 9, an example of displaying tags "microphone B", "female", "indoors", and "twenties" as significant tags is shown.

Check boxes 201 are provided to correspond to the respective tags displayed on the tag display screen 200. For example, when the user designates a check box 201 on the tag display screen 200 by operating the voice recognition device 10, the user can designate (select) a tag corresponding to the check box 201, of the tags displayed on the tag display screen 200.

It is desirable that, for example, tags indicative of the conditions of collecting the voice data included in the target data set should be selected on the tag display screen 200, but the accuracy of each tag is based on the recognition accuracy of expansion model (voice recognition model) to the target data set, and the tags of expansion model of high recognition accuracy would be tags indicative of the conditions close to the conditions of collecting the voice data included in the target data set. For this reason, for example, the tags are displayed in order of higher accuracy (i.e., a descending order) to reduce user's burden on selecting the tag, on the tag display screen 200.

In addition, "tags added for search" fields 202 are provided on the tag display screen 200. The user can input (add) tags indicative of the conditions for collecting the voice data included in the target data set, to the fields 202, by operating the voice recognition device 10.

On the tag display screen 200, for example, a related tag related to the tags displayed as the "significant tag list" (or a related tag related to the expansion models stored in the database 19 in association with the tags) may be further displayed although its illustration is omitted in FIG. 9. This related tag is a tag created in the related tag creation processing shown in FIG. 6 and can be acquired from the database 19. In this case, the user can select a desired related tag from the related tags displayed on the tag display screen 200, similarly to the tags displayed as the "significant tag list".

The user can select or input a desired tag on the tag display screen 200 as described above, but the user may be able to select one tag or plural tags.

In addition, a button 203 represented as, for example, "create new model" is provided on the tag display screen 200. When that tag selection or input is completed, the user instructs creation of a new model by executing an operation of pressing the button 203.

To assist the user's tag selection, a certainty factor of the tag, or the like may be further displayed on the tag display screen 200. The certainty factor of each tag may be a value computed based on a position (distance) of accuracy of the tag from a center position of a distribution of accuracies (t values) of all the tags. In addition, the other information such as voice data and the (file name of) text included in the target data set acquired in step S1 shown in FIG. 7 may be further displayed on the tag display screen 200.

In the following descriptions, a tag selected or input on the tag display screen 200 by the user is called a designated tag for convenience.

The descriptions return to FIG. 7, and the second model creation module 16 acquires (information of) the designated tag in response to the user's operation and acquires the expanded data set based on the designated tag (step S25). In step S25, the data set of the expansion model stored in the database 19 in association with the designated tag (i.e., the data set including the voice data collected under the conditions represented by the designated tag) is acquired as the expanded data set.

If plural tags are selected or input on the tag display screen 200, the data set of the expansion model associated with all of the plural tags (designated tags) is assumed to be acquired.

It is assumed that the tags "microphone B", "female", and "twenties" are selected on the tag display screen 200 as shown in, for example, FIG. 9. All the tags "microphone B", "female", and "twenties" are included in the tags of expansion model B, with reference to FIG. 5. For this reason, the data set of expansion model B is acquired in step S25. In contrast, the tag "twenties" is included but the tags "microphone A" and "female" are not included in the tags of expansion model A shown in FIG. 4. For this reason, the data set of expansion model A is not acquired in step S25.

Next, the second model creation module 16 determines whether the data amount of the target data set acquired in step S21 and the expanded data set acquired in step S25 is sufficient to create a voice recognition model of a high recognition accuracy or not (step S26). Since the processing in step S26 is the same as the processing in step S3 shown in FIG. 3, its detailed descriptions are omitted here.

If it is determined that the data amount of the target data set and the expanded data set is not sufficient (NO in step S26), the second model creation module 16 creates a data set to be added as the expanded data set (hereinafter referred to as an additional data set) (step S27).

The processing in step S27 will be described here. In step S27, the second model creation module 16 acquires the related text from a Web site, and the like by clawing. The related text acquired here may be, for example, a text including the designated tags or a text including the related tags which are related to the designated tags stored in the database 19.

The second model creation module 16 converts the acquired related text into voice (voice synthesis processing) and thereby creates voice data (synthetic voice data) to read the text. The voice data is created by combining phonemes corresponding to letters composing the text. In addition, the voice data created here may be further processed to be voice data recorded under the conditions (recording condition and speaker condition) under which the voice data included in the target data set is collected. More specifically, for example, noise or the like assumed to be generated under conditions represented by the designated tags may be imparted to the voice data.

The second model creation module 16 creates an additional data set including the created voice data and the related text used to create the voice data.

The second model creation module 16 creates a new model (voice recognition model) based on the target data set acquired in step S21, the expanded data set acquired in step S25, and the additional data set created in step S27 (step S28). Since the processing in step S28 is the same as the processing in step S5 shown in FIG. 3, its detailed descriptions are omitted here.

The second model creation module 16 registers the new model created in step S28, in the database 19 (step S29). The new model is registered in the database 19 in association with, for example, the designated tags and the data sets (target data set, expanded data set, and additional data set) used for creation of the new model.

If it is determined in step S26 that the data amount of the target data set and the expanded data set is sufficient (NO in step S26), the processing in step S27 is not executed. In this case, the new model may be created based on the target data set and the expanded data set in step S28.

FIG. 10 is a block diagram showing a concept of the above-described new model creation processing. Creation of new model F based on the target data set will be described with reference to FIG. 10.

In this case, it is assumed that the tags "microphone B", "female", and "twenties" are selected on the tag display screen 200 by the user.

In this case, new model F can be created by using the data set of expansion model B (data set used for creation of the expansion model B) stored in the database 19 in association with the tags "microphone B", "female", and "twenties" as the expanded data set in addition to the target data set. The new model F is registered in the database 19 in association with the tags selected by the user, i.e., "microphone B", "female", and "twenties".

That is, in the new model creation processing as described above, for example, even if the data amount of the data set (target data set) prepared by the use is insufficient, the data set (expanded data set) including the voice data assumed to be collected under conditions close to the conditions for collecting the voice data included in the data set complements the data amount, and the new model of high recognition accuracy can be thereby created.

The new model created in the new model creation processing is used for the voice recognition processing of the voice data input separately and can be used as, for example, the expansion model in creating the new model from the other data set (target data set).

The processing in step S28 is executed after executing the processing in step S27 in FIG. 7, but the processing in step S26 may be executed again after executing the processing in step S27. According to this, the data amount necessary to create the new model of high recognition accuracy can be secured certainly.

In addition, the processing in steps S26 and S27 is executed in FIG. 7 but, in the embodiments, if the new model is created with the expanded data set in addition to the target data set as described above, the voice recognition model of higher recognition accuracy can be created as compared with creating the new model with at least the target data set alone. For this reason, the processing in steps S26 and S27 may not be executed in the new model creation processing.

Next, an example of the procedure of the above-described recognition accuracy computation processing (processing in step S22 shown in FIG. 7) will be described with reference to the flowchart of FIG. 11. The recognition accuracy computation processing is executed after the processing in step S21 shown in FIG. 7, but plural data pairs (i.e., pairs of voice data and texts) are assumed to be included in the target data set acquired in step S21.

In the recognition accuracy computation processing, the following processing in steps S31 to S35 is executed for each of the expansion models stored in the database 19. In the following descriptions, the expansion model which is the target of processing in steps S31 to S34 is called a target expansion model.

In this case, the recognition processing module 14 acquires one of the plural data pairs included in the target data set from the database 19 (step S31). The data pair acquired in step S31 is called a target data pair for convenience.

Next, the recognition processing module 14 executes the voice recognition processing of the voice data included in the target data pair by using the target expansion model (step S32).

In the voice recognition processing, for example, a feature amount converted from a waveform of the voice data included in the target data pair is input to an acoustic model constituting the target expansion model (voice recognition model), and phonemes appearing in the voice data are output from the acoustic model. In addition, the phonemes output from the acoustic model are input to a language model constituting the target expansion model and converted into a text. The recognition processing module 14 can thereby acquire the text obtained by converting the voice data as a result of the voice recognition processing.

It is determined whether the voice recognition processing is executed for all the data pairs (voice data) included in the target data set or not (step S33).

If it is determined that the voice recognition processing is not executed for all the data pairs (NO in step S33), the flow returns to step S31 and the processing is repeated. In this case, in step S31, a data pair which is not subjected to the voice recognition processing is acquired.

In contrast, if it is determined that the voice recognition processing is executed for all the data pairs (YES in step S33), the extraction module 15 computes the recognition accuracy of the target expansion model by comparing the result of the voice recognition processing in step S32 with a text (hereinafter referred to as a correct text) included the data pair for which the voice recognition processing is executed (step S34).

When the processing in step S34 is executed, the recognition result text is acquired for each data pair included in the target data set by repeating the processing in step S32. In this case, the extraction module 15 determines, for example, whether the recognition result text and the correct text match for each of the data pairs or not. According to this, the extraction module 15 can compute the rate of the number of data pairs in which the recognition result text and the correct text are determined to match to the number of all the data pairs included in the target data set, as the recognition accuracy of the target expansion model.

The recognition accuracy of the target expansion model may be computed as, for example, a rate of the number of letters or words matching between the recognition result text and the correct text, to the number of letters or words constituting the text (correct text) included in all the data pairs.

Next, it is determined whether the processing in steps S31 to S34 is executed for all the expansion models stored in the database 19 or not (step S35).

If it is determined that the processing is not executed for all the expansion models (NO in step S35), the flow returns to step S31 and the processing is repeated. In this case, the processing is executed by using the expansion model which is not subjected to the processing in steps S31 to S34 as the target expansion model.

In contrast, if it is determined that the processing is executed for all the expansion models (YES in step S35), the recognition accuracy computation processing is ended.

According to the above-described recognition accuracy computation processing, the recognition accuracy is computed for each expansion model stored in the database 19. After the recognition accuracy computation processing is executed, the processing in step S23 and the following steps shown in FIG. 7 is executed.

The new model created in step S28 is registered in the database 19 in step S29 in the above-described new model creation processing shown in FIG. 7, but the confirmation screen which confirms the possibility of registration of the new model for the user may be displayed before executing the processing in step S29.

Next, an example of the procedure of the processing (hereinafter referred to as confirmation screen display processing) in displaying the confirmation screen will be described with reference to the flowchart of FIG. 12.

First, if the processing in step S28 shown in FIG. 7 is executed, for example, the second model creation module 16 creates the voice recognition model (hereinafter referred to as evaluation model) based on the target data set acquired in step S21 shown in FIG. 7 (step S41). Since the processing of creating the evaluation model is the same as the above-described processing in step S5 shown in FIG. 3, and the like, its detailed descriptions are omitted here.

The evaluation module 17 computes the recognition accuracy of the evaluation model created in step S41 (step S42). Since the processing in step S42 is the same as the processing in steps S31 to S34 shown in FIG. 11 except for using the expansion model explained in FIG. 11 as the evaluation model, detailed descriptions are omitted here.

Next, the evaluation module 17 computes the recognition accuracy (evaluation value) of the new model (step S43). Since the processing in step S43 is the same as the processing in steps S31 to S34 shown in FIG. 11 except for using the expansion model explained in FIG. 11 as the new model, detailed descriptions are omitted here.

The display processing module 18 displays the recognition accuracy of the evaluation model computed in step S42 and the recognition accuracy of the new model computed in step S43 on the confirmation screen (step S44).

Figure 13:
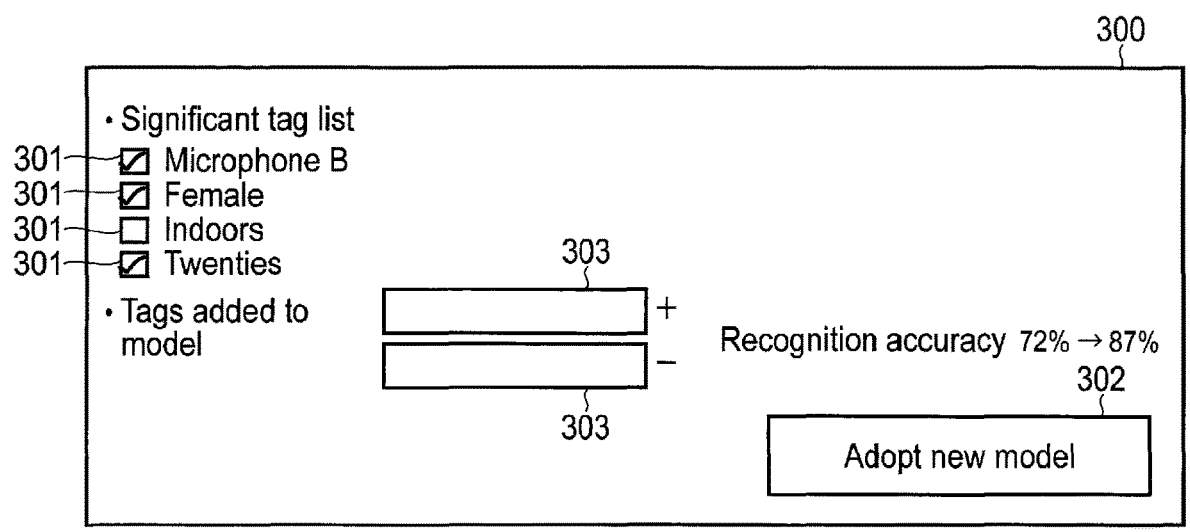
FIG. 13 is a block diagram showing an example of a confirmation screen.

FIG. 13 shows an example of the confirmation screen displayed in step S44. On the confirmation screen 300 shown in FIG. 13, the tags extracted in step S24 shown in FIG. 7 are displayed as "significant tag list", similarly to the above-described tag display screen 200 shown in FIG. 9. The tag selected by the user, on the tag display screen 200, is represented by a check box 301 corresponding to this tag.

In addition, the recognition accuracy of the evaluation model and the recognition accuracy of the new model are displayed as aspects which can be compared with each other, on the confirmation screen 300. In the example shown in FIG. 13, "recognition accuracy 72%→87%" is displayed.

The display "recognition accuracy 72%→87%" indicates that the recognition accuracy of the evaluation model (i.e., the voice recognition model created with the target data set alone) is 72% while the recognition accuracy of the new model (i.e., the voice recognition model created with the target data set and the expanded data set) is 87%.

According to this, the user can confirm that the recognition accuracy of the new model is improved as compared with the evaluation model and can press a button 302 represented as "adopt new model" provided on the confirmation screen 300. The button 302 is a button to allow (instruct) the new model to be registered in the database 19. If the button 302 is pressed (designated) by the user, the above-described processing in step S29 shown in FIG. 7 is executed and the new model is registered in the database 19.

Field "tags added to model" 303 is provided on the confirmation screen 300. The user can input (add) tags registered in the database 19 in association with the new model, to the field 303, by operating the voice recognition device 10.

More specifically, the new model (voice recognition model) is registered in the database 19 in association with the designated tags in step S29 shown in FIG. 7 as described above and, if a tag is input to the field 303 and the button 302 is pressed, the new model is registered in the database 19 in association with the designated tags and the tag input to the field 303. That is, the user can add tags which the user intends, as the tags of the new model, by inputting to the field 303, for example, the tags indicative of the conditions (recording condition and speaker condition) for collecting the voice data included in the target data set recognized by the user.

The user may determine that the new model does not need to be registered in the database 19 in accordance with the recognition accuracy of the new model to the evaluation model. In this case, for example, the designated tag may be changed so as to allow instructing the new model to be created again though not illustrated in FIG. 13. In this case, the processing in step S25 and the following steps shown in FIG. 7 may be executed again with the changed designated tag. According to this, the new model of higher recognition accuracy can be created.

As described above, the confirmation screen display processing can confirm the recognition accuracy of the new model to the evaluation model and display the confirmation screen to allow registration of the newly created model to be instructed, for the user. According to the configuration of displaying such a confirmation screen, registration of the new model which the user does not intend can be suppressed.

In the example shown in FIG. 13, the recognition accuracy of the evaluation model is displayed, but at least the recognition accuracy of the new model may be displayed on the confirmation screen 300. If the recognition accuracy of the evaluation model is not displayed, the processing in steps S41 and S42 shown in FIG. 12 may be omitted.

In the embodiments, the user is allowed to select the tag on the above-described tag display screen 200 but, for example, the new model may be created without displaying the tag display screen 200 (i.e., without allowing the user to select the tag).

Next, an example of the operation of the voice recognition device 10 in automatically creating the new model as described above will be described.

Figure 14:
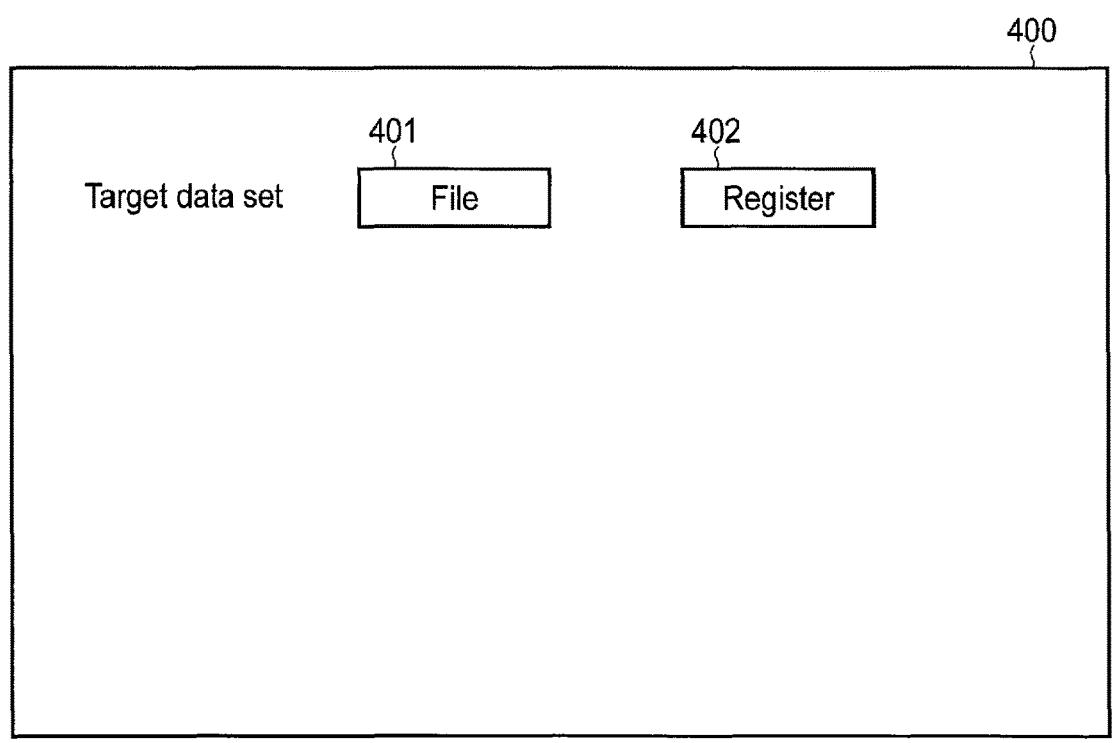
FIG. 14 is a block diagram showing an example of a target data set registration screen.

When the new model is created, for example, a target data set registration screen 400 shown in FIG. 14 is displayed.

A target data set designation field 401 and a registration button 402 are provided on the target data set registration screen 400.

The user can designate a file including the data set (target data set) prepared by the user, in the target data set designation field 401. If the file is designated in the target data set designation field 401 and then the registration button 402 is pressed, the processing of creating the new model is started. In this case, for example, the processing in steps S21 to S23 shown in FIG. 7 is executed.

The target data set registration screen 400 shown in FIG. 14 may be displayed when the processing in step S21 is executed in the new model creation processing shown in FIG. 7.

The significant tags extracted in step S23 are displayed in step S24 in the new model creation processing shown in FIG. 7 but, if the new model is created automatically, the tag used for the processing in step S25 is automatically selected from the significant tags extracted in step S23 instead of executing the processing in step S24. In this case, for example, all the significant tags extracted in step S23 may be selected or a predetermined number of tags of high accuracy, of the significant tags, may be selected.

Then, the processing in steps S24 to S29 is executed with the automatically selected tag. In the embodiments, the voice recognition device 10 may operate to automatically create the new model without allowing the user to select the tag as described above.

Even if the new model is created automatically, the confirmation screen may be displayed by executing the confirmation screen display processing shown in FIG. 12 before executing the processing in step S29.

If the confirmation screen display processing is executed, the display screen of the voice recognition device 10 transitions from the target data set registration screen 400 shown in FIG. 14 to, for example, a confirmation screen 500 shown in FIG. 15.

As shown in FIG. 15, tags 501 automatically selected as described above are displayed, and the recognition accuracy of the new model to the evaluation model is displayed similarly to the confirmation screen 300 shown in FIG. 13, on the confirmation screen 500.

In addition, a button 502 corresponding to the button 302 provided on the confirmation screen 300 is provided on the confirmation screen 500. The user can register the automatically created new model in the database 19 by pressing the button 502.

In the embodiments, as described above, the target data set (second data set) is acquired, and the voice recognition processing for the voice data (second recognition target data) included in the target data set is executed by using each of the expansion models (first recognition models) stored in the database 19. In addition, in the embodiments, a significant tag is extracted from the tags stored in the database 19 in association with the expansion models used in the voice recognition processing based on the voice recognition processing result and a text (second correct data) included in the target data set, and the data set (first data set) stored in the database 19 in association with the extracted tag is acquired as the expanded data set. In the embodiments, the new model (second recognition model) is created based on the target data set and the expanded data set.

In the embodiments, having such a configuration, for example, even if the conditions (recording condition and speaker condition) for collecting the voice data are not determined and a new model is created from the target data set in which the data amount is not sufficient, a sufficient data amount to create the voice recognition model of high recognition accuracy can be secured and a new model of high recognition accuracy can be thereby created.

That is, in the embodiments, the voice recognition of high accuracy can be implemented by converting the voice data into the text with the new model created as described above.

The new model created as described above can also be used as the expansion model and, for example, the user can improve the recognition accuracy of the newly created voice recognition model (new model) without explicitly increasing the data.

In addition, in the embodiments, the recognition accuracy of the expansion model is computed by comparing the recognition processing result of the voice data included in the target data set using the expansion model and the text included in the target data set, and the tag of significantly high recognition accuracy is extracted from the tags stored in the database 19 in association with the expansion model, by executing the t-test using the computed recognition accuracy of the expansion model (accuracy of the tag). In the embodiments, with such a configuration, the new model of high recognition accuracy can be created by extracting the tag assumed to be indicative of the conditions (recording condition and speaker condition) for collecting the voice data included in the target data set and expanding the target data set (i.e., acquiring the expanded data set).

In addition, in the embodiments, the new model can be created with the expanded data set which the user intends, by a configuration that the extracted tags are displayed and the data set stored in the database 19 in association with the tag designated by the user, of the displayed tags, is acquired as the expanded data set.

In addition, in the embodiments, the expanded data set which the user further intends can be used by further displaying the tag related to the extracted tag.

In addition, in the embodiments, the voice recognition processing of the voice data included in the target data set is executed with the created new model, the recognition accuracy of the new model is computed by comparing the voice recognition processing result and the text included in the target data set, and the computed recognition accuracy of the new model is displayed. In the embodiments, having such a configuration, the user can determine (instruct) possibility of the new model after confirming the recognition accuracy of the new model.

The recognition accuracy of the new model is displayed but may be displayed by, for example, an aspect of computing the recognition accuracy of the evaluation model created based on the target data set and comparing the recognition accuracy of the new model with the recognition accuracy of the evaluation model. According to such a configuration, the user can easily understand improvement of the recognition accuracy caused by creating the new model with the above-described expanded data set.

In addition, if it is determined that the data amount of the target data set and the expanded data set is not sufficient, in the embodiments, an additional data set (third data set) is created based on the target data set and the new model is created by further using the additional data set. The additional data set includes voice data (third voice data) created from a related text (third text) acquired based on the keywords extracted from the text included in the target data set, and also includes the related text.

In the embodiments, having such a configuration, even if the data amount of the target data set and the expanded data set is not sufficient for creation of the voice recognition model of high recognition accuracy, the new model of high recognition accuracy can be created by further adding the data set.

In the embodiments, the voice recognition model (new model) is created from the target data set, but the embodiments may be applied to creation of an acoustic model. In this case, the acoustic model of high accuracy can be created similarly to the embodiments, by using the data set described in the embodiments as, for example, the data set including voice data and phonemes which are to be output (extracted) from the voice data and using the voice recognition model described in the embodiments as the acoustic model.

Furthermore, the embodiments may be applied to creation of a language model. In this case, the language model of high accuracy can be created similarly to the embodiments, by using the data set described in the embodiments as, for example, the data set including phonemes and a text which is to be converted from the phonemes and using the voice recognition model described in the embodiments as the language model.

In addition, the embodiments may be applied to, for example, creation of the other recognition model on images, dialog scenario, and the like besides the models on voice recognition (voice recognition model, acoustic model, and language model).

That is, the embodiments can be applied to, for example, creation of the recognition model used to recognize the recognition target data and output the recognition result.

The voice recognition device 10 is a single device in the embodiments, but the voice recognition device 10 of the embodiments may be implemented as, for example, a voice recognition system composed of a terminal device 10a used by the user, a server device 10b connected communicably with the terminal device 10a, and the like, as shown in FIG. 16. In the voice recognition system shown in FIG. 16, the terminal device 10a and the server device 10b are connected via, for example, a network 10c such as the Internet.

In this case, the modules 11 to 19 shown in FIG. 1 as described in the embodiments may be provided to be distributed in the terminal device 10a and the server device 10b.

More specifically, for example, a configuration of including the acquisition module 13 and the display processing module 18 at the terminal device 10a and including the first model creation module 11, the related tag creation module 12, the recognition processing module 14, the extraction module 15, the second model creation module 16, the evaluation module 17, and the database 19 at the server device 10b can be formed.

In this case, the target data set input (acquired) at the terminal device 10a is transmitted from the terminal device 10a to the server device 10b, and the new model is created from the target data set as described in the embodiments, at the server device 10b. The above-described tag display screen, confirmation screen, and the like may be displayed at the terminal device 10a.

In addition, for example, a configuration of including the acquisition module 13, the recognition processing module 14, the extraction module 15, the second model creation module 16, the evaluation module 17, and the display processing module 18 at the terminal device 10a and including the first model creation module 11, the related tag creation module 12, and the database 19 at the server device 10b may be formed. According to this, the above-described new model creation processing can be executed at the terminal device 10a, and the processing other than the new model creation processing (for example, the expansion model registration processing, the related tag creation processing, and the like) can be executed at the server device 10b.

Furthermore, for example, the terminal device 10a may include the modules 11 to 18 while the server device 10b may include the database 19 alone.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recognition device, comprising:
storage configured to store:
a first recognition model created based on a first data set and a second recognition model created based on a second data set, the first data set comprising first recognition target data collected under a first condition and first correct data to be recognized from the first recognition target data, and the second data set comprising second recognition target data collected under a second condition and second correct data to be recognized from the second recognition target data,
the first data set and the second data set,
first and second tags indicative of the first condition,
third and fourth tags indicative of the second condition; and
a processor configured to:
acquire a third data set comprising third recognition target data and third correct data to be recognized from the third recognition target data;
execute recognition processing of the third recognition target data in the third data set by using each of the first recognition model and the second recognition model stored in the storage;
compute a first recognition accuracy of the first recognition model by comparing a result of the recognition processing obtained by using the first recognition model with the third correct data;
compute a second recognition accuracy of the second recognition model by comparing a result of the recognition processing obtained by using the second recognition model with the third correct data;
use the computed first recognition accuracy as an accuracy of each of the first and the second tags;
use the second computed second recognition accuracy as an accuracy of each of the third and the fourth tags;
acquire a representative value based on the first recognition accuracy and the second recognition accuracy when the first tag is the same as the third tag;
extract a particular tag of the first to the fourth tags based on the acquired representative value as an accuracy of each of the first and the third tags, the first recognition accuracy as the accuracy of the second tag, and the second recognition accuracy as the accuracy of the fourth tag; and
create a third recognition model based on the acquired third data set and a data set corresponding to the extracted particular tag among the first data set and the second data set.

2. The recognition device of claim 1, wherein
the first recognition target data in the first data set comprises first voice data,
the first correct data in the first data set comprises a first text written from the first voice data,
the third recognition target data in the third data set comprises second voice data,
the third correct data in the third data set comprises a second text written from the second voice data, and
the recognition processing comprises processing of recognizing voice from the voice data and converting the voice into a text.

3. The recognition device of claim 2, wherein the processor is configured to:
input third voice data, and
convert the third voice data into a third text with the created third recognition model.

4. The recognition device of claim 2, wherein the processor is configured to:
display the extracted particular tag; and
create the third recognition model based on the acquired third data set and the data set in accordance with a designation of the extracted particular tag by a user.

5. The recognition device of claim 4, wherein the processor is configured to display a tag related to the extracted particular tag.

6. The recognition device of claim 2, wherein the processor is configured to:
execute recognition processing of the second voice data in the third data set by using the created third recognition model;
compute a recognition accuracy of the third recognition model by comparing the recognition processing result of the second voice data using the created third recognition model with the second text; and display the computed recognition accuracy of the third recognition model.

7. The recognition device of claim 6, wherein the processor is configured to:

create a fourth recognition model based on the third data set;

execute recognition processing of the second voice data in the third data set by using the created fourth recognition model;

compute a recognition accuracy of the fourth recognition model by comparing the recognition processing result of the second voice data using the created fourth recognition model with the second text in the third data set; and display the recognition accuracy of the third recognition model and the recognition accuracy of the fourth recognition model.

8. The recognition device of claim 2, wherein the processor is configured to:

determine whether a data amount of the acquired third data set and the data set corresponding to the extracted particular tag is sufficient or not;

create a fourth data set based on the third data set if it is determined that the data amount of the third data set and the first data set is not sufficient;

create a fourth recognition model, based on the acquired third data set, the first data set corresponding to the extracted particular tag, and the created fourth data set.

9. The recognition device of claim 8, wherein the processor is configured to:

create third voice data from a third text acquired based on a keyword extracted from the second text in the third data set; and create the fourth data set comprising the third voice data and the third text.

10. A method executed by a recognition device comprising storage configured to store: (i) a first recognition model created based on a first data set and a second recognition model created based on a second data set, the first data set comprising first recognition target data collected under a first condition and first correct data to be recognized from the first recognition target data, and the second data set comprising second recognition target data collected under a second condition and second correct data to be recognized from the second recognition target data, (ii) the first data set and the second data set, (iii) first and second tags indicative of the first condition, and (iv) third and fourth tags indicative of the second condition, the method comprising:

acquiring a third data set comprising third recognition target data and third correct data to be recognized from the third recognition target data;

executing recognition processing of the third recognition target data in the third data set by using each of the first recognition model and the second recognition model stored in the storage;

computing a first recognition accuracy of the first recognition model by comparing a result of the recognition processing obtained by using the first recognition model with the third correct data;

computing a second recognition accuracy of the second recognition model by comparing a result of the recognition processing obtained by using the second recognition model with the third correct data;

using the computed first recognition accuracy as an accuracy of each of the first and the second tags;

using the second computed second recognition accuracy as an accuracy of each of the third and the fourth tags;

acquiring a representative value based on the first recognition accuracy and the second recognition accuracy when the first tag is the same as the third tag;

extracting a particular tag of the first to the fourth tags based on the acquired representative value as an accuracy of each of the first and the third tags, the first recognition accuracy as the accuracy of the second tag, and the second recognition accuracy as the accuracy of the fourth tag; and creating a third recognition model based on the acquired third data set and a data set corresponding to the extracted particular tag among the first data set and the second data set.

11. A non-transitory computer-readable storage medium having stored thereon a computer program which is executable by a computer using storage configured to store: (i) a first recognition model created based on a first data set and a second recognition model created based on a second data set, the first data set comprising first recognition target data collected under a first condition and first correct data to be recognized from the first recognition target data, and the second data set comprising second recognition target data collected under a second condition and second correct data to be recognized from the second recognition target data, (ii) the first data set and the second data set, (iii) first and second tags indicative of the first condition, and (iv) third and fourth tags indicative of the second condition, the computer program comprising instructions capable of causing the computer to execute functions of:

acquiring a third data set comprising third recognition target data and third correct data to be recognized from the third recognition target data;

executing recognition processing of the third recognition target data in the third data set by using each of the first recognition model and the second recognition model stored in the storage;

computing a first recognition accuracy of the first recognition model by comparing a result of the recognition processing obtained by using the first recognition model with the third correct data;

computing a second recognition accuracy of the second recognition model by comparing a result of the recognition processing obtained by using the second recognition model with the third correct data;

using the computed first recognition accuracy as an accuracy of each of the first and the second tags;

using the second computed second recognition accuracy as an accuracy of each of the third and the fourth tags;

acquiring a representative value based on the first recognition accuracy and the second recognition accuracy when the first tag is the same as the third tag;

extracting a particular tag of the first to the fourth tags based on the acquired representative value as an accuracy of each of the first and the third tags, the first recognition accuracy as the accuracy of the second tag, and the second recognition accuracy as the accuracy of the fourth tag; and creating a third recognition model based on the acquired third data set and a data set corresponding to the extracted particular tag among the first data set and the second data set.

* * * * *